United States Patent
Spangler et al.

(10) Patent No.: US 12,003,964 B2
(45) Date of Patent: Jun. 4, 2024

(54) ANONYMOUS DEVICE AUTHENTICATION

(71) Applicant: Google LLC, Mountain View, CA (US)

(72) Inventors: Randall Spangler, San Jose, CA (US); Kiavash Faraji, Newark, CA (US)

(73) Assignee: Google LLC, Mountain View, CA (US)

( * ) Notice: Subject to any disclaimer, the term of this patent is extended or adjusted under 35 U.S.C. 154(b) by 116 days.

(21) Appl. No.: 17/268,668

(22) PCT Filed: Jun. 30, 2020

(86) PCT No.: PCT/US2020/040240
§ 371 (c)(1),
(2) Date: Feb. 16, 2021

(87) PCT Pub. No.: WO2021/003127
PCT Pub. Date: Jan. 7, 2021

(65) Prior Publication Data
US 2022/0116776 A1    Apr. 14, 2022

Related U.S. Application Data

(60) Provisional application No. 62/870,167, filed on Jul. 3, 2019.

(51) Int. Cl.
*H04W 12/069*    (2021.01)
*H02J 7/00*    (2006.01)
(Continued)

(52) U.S. Cl.
CPC ....... *H04W 12/069* (2021.01); *H02J 7/00045* (2020.01); *H02J 50/10* (2016.02);
(Continued)

(58) Field of Classification Search
CPC ........ H02J 7/00045; H02J 50/10; H02J 50/80; H04L 9/3247; H04L 63/08; H04W 12/0431; H04W 12/069; H04W 12/50
See application file for complete search history.

(56) References Cited

U.S. PATENT DOCUMENTS 9,642,006 B2   5/2017   Bronk
10,193,700 B2 *   1/2019   Liu ............ H04W 12/069
(Continued)

FOREIGN PATENT DOCUMENTS

CN    103503366    1/2014
CN    106031087    10/2016
(Continued)

OTHER PUBLICATIONS

PCT International Preliminary Report on Patentability in International Appln. No. PCT/US2020/040240, dated Jan. 13, 2022, 10 pages.
(Continued)

*Primary Examiner* — Chau Le
(74) *Attorney, Agent, or Firm* — Fish & Richardson P.C.

(57) ABSTRACT

Methods, systems, apparatus, and computer-readable storage devices for anonymous device authentication. A method includes: accessing, by the electronic device, data stored by the electronic device that identifies authentication keys the electronic device accepts as valid; sending, by the electronic device to a second electronic device, an authentication request that identifies a set of authentication keys including at least some of authentication keys the electronic device accepts as valid; and receiving, by the electronic device, response data that the second electronic device provides in response to the authentication request. The response data (i) identifies a particular authentication key from the set of authentication keys identified by the authentication request, and (ii) includes a signature generated using the particular authentication key. The method includes authenticating, by the electronic device, the second electronic device by determining that the received signature was generated using the particular authentication key.

14 Claims, 8 Drawing Sheets

(51) Int. Cl.
  *H02J 50/10* (2016.01)
  *H02J 50/80* (2016.01)
  *H04L 9/08* (2006.01)
  *H04L 9/30* (2006.01)
  *H04L 9/32* (2006.01)
  *H04L 9/40* (2022.01)
  *H04W 12/0431* (2021.01)
  *H04W 12/50* (2021.01)
  *H02J 50/40* (2016.01)

(52) U.S. Cl.
  CPC ............ *H02J 50/80* (2016.02); *H04L 9/0891* (2013.01); *H04L 9/3073* (2013.01); *H04L 9/3247* (2013.01); *H04L 63/08* (2013.01); *H04W 12/0431* (2021.01); *H04W 12/50* (2021.01); *H02J 50/40* (2016.02)

(56) References Cited

U.S. PATENT DOCUMENTS

| | | | |
|---|---|---|---|
| 2005/0127867 A1* | 6/2005 | Calhoon | G06F 1/26 320/108 |
| 2011/0093714 A1 | 4/2011 | Schaecher et al. | |
| 2013/0257364 A1 | 10/2013 | Redding | |
| 2014/0325218 A1 | 10/2014 | Shimizu et al. | |
| 2019/0044393 A1* | 2/2019 | Louis | H04B 5/79 |

FOREIGN PATENT DOCUMENTS

| | | |
|---|---|---|
| CN | 108881310 | 11/2018 |
| EP | 3090520 B1 | 1/2018 |
| EP | 3293706 | 3/2018 |
| JP | H10-32570 | 2/1998 |
| JP | 2000-227755 | 8/2000 |
| JP | 2004-527188 | 9/2004 |
| JP | 2006-050209 | 2/2006 |
| JP | 2006-050210 | 2/2006 |
| JP | 2015-520593 | 7/2015 |
| JP | 2019-062394 | 4/2019 |

OTHER PUBLICATIONS

Office Action in Indian Appln. No. 202147061851, dated Jun. 9, 2022, 7 pages (with English Translation).
PCT International Search Report and Written Opinion in International Appln. No. PCT/US2020/040240, dated Sep. 17, 2020, 15 pages.
Notice of Allowance in Chinese Appln. No. 202080004805.7, dated Jan. 5, 2023, 4 pages (with English translation).
Notice of Allowance in European Appln. No. 20745370.5, dated Nov. 4, 2021, 7 pages.
Notice of Allowance in Japanese Appln. No. 2021-578086, dated May 23, 2023, 5 pages (with English translation).
CN Office Action in Chinese Appln. No. 202080004805.7, dated Sep. 7, 2022, 6 pages (with English Translation).
Extended European Search Report in European Appln. No. 22152798.9, mailed on Apr. 8, 2022, 8 pages.
Xiao-Jiao, "The Design and Realization of NFC Mobile Application Platform Based on Android" Thesis for the degree of Master of Engineering, Southeast University, Apr. 2017, 81 pages (with English abstract).
Zhao et al., "Privacy-preserving billing scheme against Free-Riders for wireless charging electric vehicles" Mobile Information Systems 2017, Jan. 2017, 9 pages.

* cited by examiner

ANONYMOUS DEVICE AUTHENTICATION

CROSS-REFERENCE TO RELATED APPLICATION

This application is a National Stage Application under 35 U.S.C. § 371 and claims the benefit of International Application No. PCT/US2020/040240, filed Jun. 30, 2020, which claims priority to U.S. Application No. 62/870,167, filed on Jul. 3, 2019, which is incorporated by reference.

TECHNICAL FIELD

This specification generally relates to authentication of electronic devices.

BACKGROUND

Electronic authentication is a process of verifying digital credentials of electronic devices.

SUMMARY

When an electronic device is plugged into a charger or placed in range of a wireless charger, it is desirable for the device to authenticate that the charger is genuine or certified before requesting that the charger deliver power. This protects the device from being exposed to high currents and voltages that may be delivered by a counterfeit charger. Likewise, a charger may verify that a device is genuine or certified before providing current to the device. The authentication techniques discussed herein can be used for wired power delivery, wireless power delivery, and for other device interactions that do not involve power transfer.

In some implementations, the authentication process satisfies several constraints to improve security, privacy, and usability. For example, one constraint is that the authentication process operate without relying on a network connection or any device other than the charger and the device to be charged. Another constraint is that the authentication process be substantially anonymous, so that a charger cannot uniquely identify a specific charged device and/or the charged device cannot uniquely identify a specific charger. As another example, it is desirable that credentials of compromised devices be revocable to block the use of devices that have been compromised or had their credentials improperly duplicated. However, revocation of credentials for compromised devices should cause very few, if any, uncompromised chargers or devices to no longer pass the authentication process. These constraints and ways to satisfy them are discussed in detail below.

In some implementations, the verification process between electronic devices and chargers is designed to occur without an Internet connection or any other connection to a network. In other words, the charged device and charger can be configured to authenticate each other by direct communication, without the need to communicate with any other devices (that is, the messages passed between the charged device and charger are not relayed by any other device). This can be helpful when a network connection is not available, for example, if a traveler needs to charge a device in an airport in a country where the traveler does not have Internet service. The charged device, the charger, or both, may have the ability to connect to the Internet or another network. In some implementations, network connections may be used at times for updates or configuration, as discussed below. Nevertheless, an active network connection is not required for the authentication process at the time of charging. Also, in many cases the charger is unlikely to have Internet access itself, because that would add significantly to the cost of the charger. In many cases, the charger can communicate only with the device to be charged, for example, over a charging cable or a short-range wireless connection, such as inductive coupling for wireless charging or Bluetooth.

To protect against potential misuse of credentials, the authentication scheme can allow for revocation of credentials. For example, a counterfeiter may dismantle a valid device to extract its certificates, and then use those certificates in the counterfeit devices. Accordingly, the system can have a revocation mechanism for revoking certifications compromised in this way. Revoking a certification should result in de-authenticating as few valid devices (e.g., genuine chargers or genuine charged devices) as possible. In particular, it is undesirable for the revocation of a single certificate to de-authenticate all devices of a given model. Thus, even devices of the same model or type should not all rely on the same certificate for authentication. At the same time, individual devices should not rely on unique certificates in the authentication process, because this would allow individual devices (e.g., chargers or charged devices) to be uniquely identified and thus would take away anonymity.

The authentication process may be used for any anonymized authentication between devices. The process can be two-way anonymized, where two devices each confirm that the other is valid without providing uniquely identifying information. In some cases, the process may be one-way anonymized, where the identity of only one of the devices is hidden. Similarly, the authentication may be one-way, with only one device proving its authorization to the other, or two-way, with both devices each proving their authorization to the other. Although power delivery (referred to simply as "charging" herein) is a useful application for anonymous authentication, the techniques discussed herein can be used for any other application where two devices each want to confirm that the other one is a valid device to communicate with, and one or both of the devices want to carry out authentication without providing uniquely identifying information.

When anonymous authentication is used for charging, a charger is not able to uniquely identify a charged device, and a charged device is not able to uniquely identify a charger. Anonymous authentication can be used to maintain user privacy. The threat model may be asymmetric. That is, it may be more important for the charged device to protect itself against an invalid charger than vice versa.

In one general aspect, a method performed by an electronic device includes: accessing, by the electronic device, data stored by the electronic device that identifies authentication keys the electronic device accepts as valid; sending, by the electronic device to a second electronic device, an authentication request that identifies a set of authentication keys including at least some of the authentication keys the electronic device accepts as valid; and receiving, by the electronic device, response data that the second electronic device provides in response to the authentication request. The response data (i) identifies a particular authentication key from the set of authentication keys identified by the authentication request, and (ii) includes a signature generated using the particular authentication key. The method includes authenticating, by the electronic device, the second electronic device by determining that the received signature was generated using the particular authentication key.

In another general aspect, a method performed by an electronic device includes: receiving, by the electronic device, an authentication request identifying a set of authentication keys; identifying, by the electronic device, an authentication key stored by the electronic device that is in the set identified by the authentication request; using, by the electronic device, the identified authentication key to generate a signature; and providing, by the electronic device, response data in response to receiving the authentication request, the response data including (i) the signature and (ii) an identifier for the authentication key used to generate the signature.

Other embodiments of these and other aspects include corresponding systems, apparatus, and computer programs, configured to perform actions of methods encoded on computer storage devices. A system of one or more computers or other processing devices can be so configured by virtue of software, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features.

In some implementations, the second electronic device is a wireless charger and the electronic device is a device to be charged by the wireless charger.

In some implementations, the method further includes, in response to authenticating the second electronic device, initiating charging of the electronic device by the second electronic device or increasing power transfer from the second electronic device to the electronic device.

In some implementations, sending the authentication request and receiving the response data are performed using a direct communication link between the electronic device and the second electronic device.

In some implementations, the direct communication link between the electronic device and the second electronic device includes an electromagnetic coupling between a power transmission coil of the second device and a power receiving coil of the electronic device, the electronic device including a battery and circuitry configured to charge the battery based on power received using the power receiving coil.

In some implementations, accessing the data stored by the electronic device that identifies authentication keys the electronic device accepts as valid includes accessing data that identifies a set of key indices corresponding to valid authentication keys. The authentication request specifies the set of key indices; the response data identifies the particular authentication key by indicating a particular key index for the particular authentication key; and authenticating the second electronic device includes determining that the received signature was generated using an authentication key corresponding to the particular key index.

In some implementations, the authentication request includes a nonce. The method further includes, in response to receiving the response data, obtaining, from data storage of the electronic device, a public key that corresponds to the particular authentication key or a hash of the public key. Authenticating the second electronic device includes using the public key or the hash to determine that that the signature was generated as a function of the nonce and a private key that corresponds to the public key.

In some implementations, the method includes storing, before sending the authentication request, public keys corresponding to each of the authentication keys in set of authentication keys.

In some implementations, the method includes storing, before sending the authentication request, hashes of public keys corresponding to each of the authentication keys in set of authentication keys.

In some implementations, the method includes detecting, by the electronic device, the second electronic device. Sending the authentication request is performed in response to detecting the second electronic device.

In some implementations, the second electronic device stores only a proper subset of the indicated set of authentication keys. For example, it may store few than one half of the authentication keys, or even few than 25% or 10% of the indicated set of authentication keys.

In some implementations, the accessing, sending, receiving, and authenticating are performed in an anonymous manner such that neither the electronic device nor the second electronic device provides uniquely identifying information.

In some implementations, the electronic device is a wireless charger, and the authentication request is received from a device to be charged that is in proximity to the wireless charger.

In some implementations, identifying the authentication key includes: determining that a set of stored authentication keys stored by the electronic device includes multiple authentication keys in the set of authentication keys identified by the authentication request; and selecting one of the stored authentication keys determined to be included in the set of authentication keys identified by the authentication request.

In some implementations, the authentication request indicates multiple key indices that identify the set of authentication keys. The identifier in the response data includes a key index from among the multiple key indices.

In some implementations, the authentication request includes a nonce. Using the identified authentication key to generate a signature includes generating the signature using a private key stored by the electronic device and the nonce.

In some implementations, the method includes providing to the electronic device, in the response data, a public key corresponding to the private key.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A and 3B are diagrams illustrating examples of processes of performing anonymous authentication.

DETAILED DESCRIPTION

Figure 1:
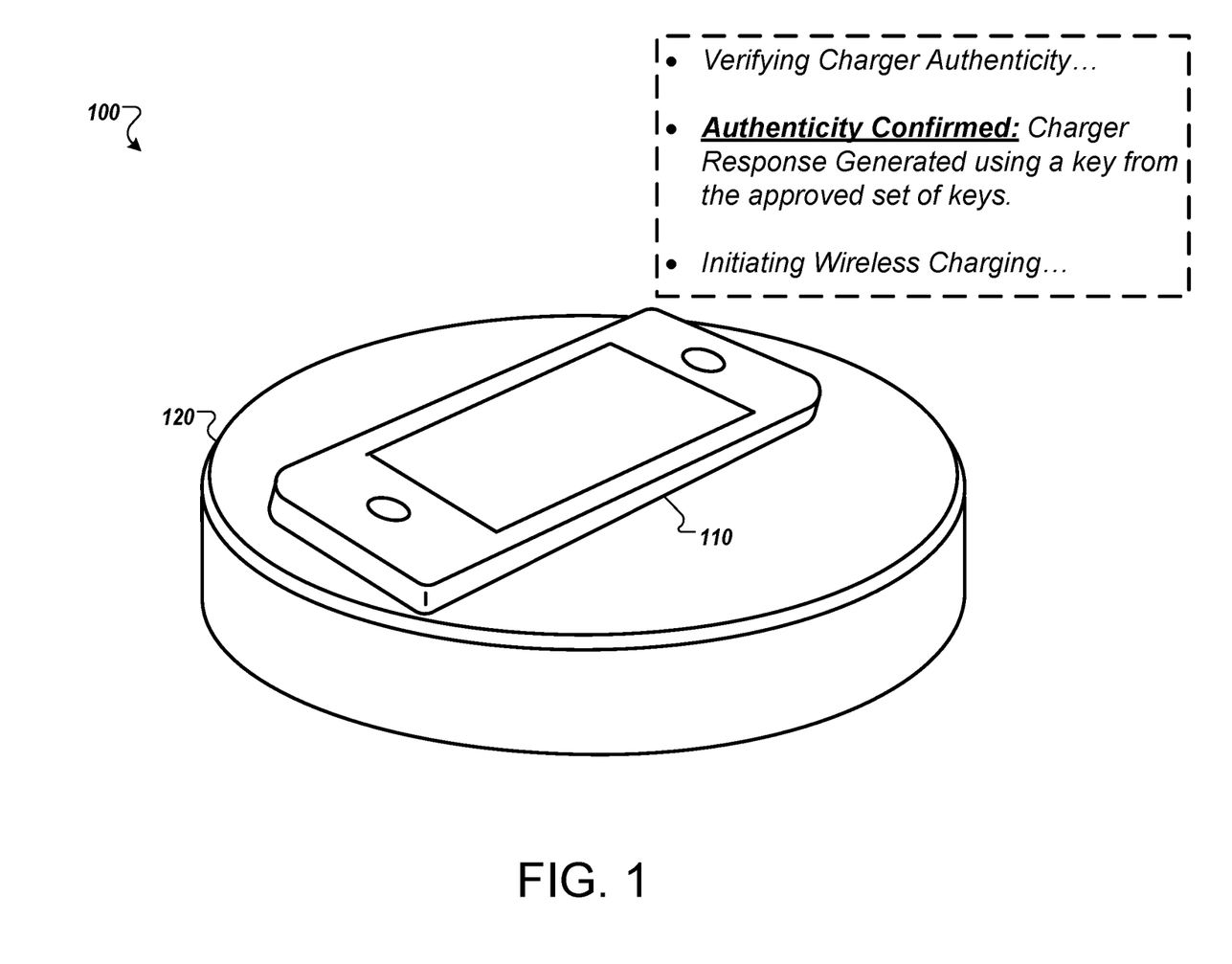
FIG. 1 is a diagram illustrating anonymous authentication of a wireless charger and a device to be charged.

FIG. 1 is an illustration of an example environment 100 that includes a device 110 and a charger 120. In the example, the device 110 authenticates the charger before requesting power and initiating charging.

The device 110 stores information about an approved set of keys, any one of which the charger 120 can use to prove its authenticity. The device 110 communicates with the charger 120 to begin the process of authenticating the charger 120. For example, the device 110 may indicate the set of keys (typically, a plurality of keys) that the device 110 considers to be valid. The charger 120 cannot determine the identity of the device 110 because the message from the device 110 to the charger 120 does not include any uniquely identifying information about the device 110. The charger 120 then generates and provides a response to the device 110 using one of the keys from the approved set of keys. Because the response is generated using one of several valid keys, none of which are unique to the particular charger 120, the device 110 cannot determine the identity of the charger 120. The device 110 examines the response from the charger 120 and verifies that it was in fact generated using one of the approved keys, which confirms that the charger 120 is authentic. Once the device 110 confirms the authenticity of the charger 120 is confirmed, the device 110 initiates charging.

In general, a device 110 may require authentication before requesting or accepting power at certain power levels or operating modes. In some implementations, the device 110 may block all power transfer until authentication occurs. In other implementations, the device 110 may allow power transfer in one or more modes, such as a default low-power charging mode before authentication, but may require authentication before initiating power transfer in one or more other modes, such as a high-power charging mode. For some wireless chargers, some level of electromagnetic coupling and power transfer occurs as a part of communicating to set the parameters for the charging cycle, and so the device 110 naturally may allow this low or default level of power transfer to occur before or during the authentication process, prior to initiating charging in a higher power or fast charging mode.

In the example of FIG. 1, the charger 120 is a wireless charger configured to deliver power to the device 110 wirelessly. Power is transferred through inductive coupling of a power transmission coil in the charger 120 with a power receiving coil in the device 110. The data communication that occurs between the device 110 and the charger 120 to carry out the anonymous authentication can be achieved through the electromagnetic coupling of the coils. For example, the charger 120 may modulate the frequency of transmissions from its transmission coil to provide data to the device 110, and the device 110 may modulate the effective impedance of its receiving coil to provide data to the charger 120. In some implementations, power delivery and communication may occur according to the Qi wireless charging standard or other wireless charging standards.

Other types of communication between the device 110 and the charger 120 may additionally or alternatively be used to perform the authentication. For example, the device 110 and the charger 120 may communicate using a short-range radio-frequency communication link such as Bluetooth or Wi-Fi. Typically, communication takes place over a direct link between the device 110 and charger 120, and does not require a connection of either device to a communication network.

Although the example of FIG. 1 and other examples discussed below involve wireless charging, the same authentication technique can be used for wired charging. For example, the charger 120 can be a wired charger that connects to a charging port on the device 110 via a charging cable. In this case, the communication between the charger 120 and the device 110 can occur over the charging cable.

In the example of FIG. 1, the device 110 initiates the authentication process in which the device 110 verifies the authenticity or credentials of the charger 120. Nevertheless, in some implementations, the charger 120 can additionally or alternatively initiate a similar authentication process to verify the authenticity of the device 110. For example, the charger 120 may require proof of authenticity of the device to be charged before providing power in certain operating modes or power levels, such as high-power or fast charging modes that are only supported for certain device types. In some implementations, both the device 110 and the charger 120 can initiate the authentication processes to verify the authenticity of the other apparatus.

Figure 2A:
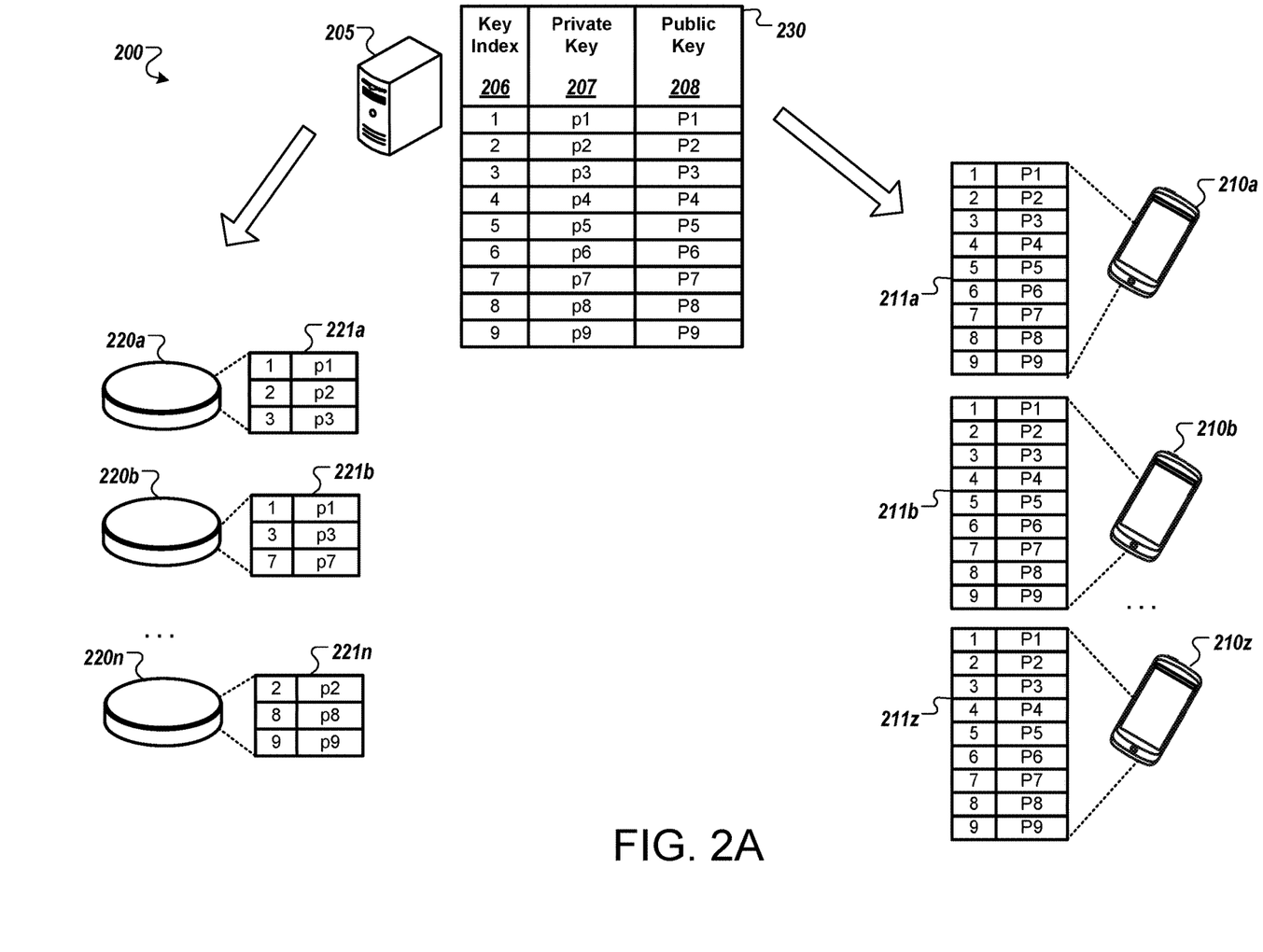
FIGS. 2A and 3B are block diagrams showing examples of systems for configuring devices to perform anonymous authentication.

FIG. 2A is a block diagram showing a system 200 for configuring devices to perform anonymous authentication. For example, FIG. 2A shows how different devices can be set up by manufacturers with the appropriate authentication keys and other data, so that they are able to later perform anonymous authentication. As discussed further below, this set-up process of providing the needed data to the different devices may additionally or alternatively occur after manufacture in some implementations, through a software update, a firmware update, or another process.

The system 200 includes a computer system 205 that generates authentication keys and other related data. The system 200 also includes chargers 220a-220n and chargeable devices 210a-210z. The computer system 205 generates and provides the information that the chargers 220a-220n and chargeable devices 210a-210z will need to effectively perform anonymous authentication.

The computer system 205 acts as a central authority that defines the authentication scheme and sets the authentication keys to be used. The actions of the computer system 205 may be distributed across multiple computers or may involve the coordination of multiple computers. For example, in some implementations a group of multiple manufacturers may desire to make different chargers 220a-220n and chargeable devices 210a-210z that are interoperable, even though they are manufactured by different companies. The computer system 205 may assign the keys and other data to the different manufacturer and to different sets of devices to allow proper authentication.

In general, the computer system 205 defines a large set of authentication key pairs, for example, M=1000 authentication key pairs. Of course, more or fewer may be used depending on the application (e.g., 100, 500, 2000, 5000, etc.). Each authentication key pair includes a private key and a public key. In some implementations, the computer system 205 uses elliptic curve cryptography to generate the key pairs. As an example, the public and private keys can each be 256 bits, though other lengths may be used (e.g., 128 bit, 512 bit, etc.). Each public-private key pair is assigned to a specific key index value, for example, with 1000 key pairs being assigned index values 0-999 respectively.

Once the set of key pairs has been determined, the computer system 205 selects different subsets of the keys to load onto different charger devices 220a-220n. Each subset typically includes keys from only a small portion of the total set of authentication key pairs, for example, keys for only 2%, 3%, 5%, or 10% of the key indices. For example, if 1000 key pairs are defined, each charger 220a-220n may receive and store keys for only 32 of the key indices. Even within the same model of charger, different instances of the charger will receive different subsets of keys.

Many different techniques may be used to select the subsets of keys loaded to different chargers 220a-220n. In some implementations, the subset for each charger 220a-220n is separately selected randomly or pseudo-randomly. In other implementations, a portion of the subset is selected randomly or pseudo-randomly for each individual charger 220a-220n, but another portion of the subset is shared by multiple chargers 220a-220n in the same manufacturing batch. For example, of 32 keys, 16 keys may be selected for every charger randomly or pseudo-randomly and another 16 keys may be shared by all chargers manufactured that day. In some implementations, some keys are selected randomly or pseudo-randomly, while certain keys are shared by all chargers of the same model type. This can enhance compatibility of the model with other devices, but with the tradeoff of increase risk of needing to later revoke those shared keys if the device is compromised. For inexpensive devices or for small batches, all chargers 220a-220n in the batch may share the entire subset of keys, e.g., with chargers in a first batch all receiving a first subset of keys, and the next batch of chargers all receiving a second subset of keys, and so on.

Accordingly, the different subsets of keys for the chargers 220a-220n can be overlapping and can be selected, in whole or in part, randomly or pseudo-randomly. In this way, for a given model of charger, all instances of the charger will have some number (typically the same number) of the valid authentication keys. However, each charger instance will have only a small number of the total valid authentication keys. This helps to maintain security, so that if one charger is compromised and the authentication keys taken, only a small percentage of the total number of authentication keys are compromised. In addition, the set of authentication keys held by a charger instance is not unique and so does not uniquely identify a specific charger instance.

To prevent counterfeiting, instead of each charger 220a-220n having a random subset of keys, the subset of keys for some chargers 220a-220n may be selected from only a part of the overall set of keys. For example, a factory may choose each day a group of 100 keys from the full list of 1,000 keys. All chargers 220a built on that day can load 32 random keys selected from that group of 100 keys. If a potential attacker obtains several chargers 220a manufactured on the same day, which is likely if the attacker purchased a large box or shipment of chargers to attack, the potential attacker is likely to only extract the keys in the group of 100 keys. A potential attacker would need to obtain chargers from multiple locations over a longer period of time in order to obtain more of the total 1,000 keys.

In some implementations, each charger's subset of keys is sufficiently large and the keys are sufficiently distributed among different chargers so that identifying one or two keys held by a charger does not uniquely identify that charger. For example, if there are 1,000 keys and each charger loads 32 keys, with the keys being well distributed among the different key subsets, 150,000 devices could be built in which 5,000 devices have any given key.

In the example of FIG. 2A, the computer system 205 generates a total of nine public-private key pairs. Table 230 shows key index values 206, private keys 207, and public keys 208. The private keys 207 are designated p1 through p9, and the corresponding public keys 208 are designated P1 through P9. The key index values 206 are 1 through 9. Each row represents a different public-private key pair 230, e.g., in which key index 1 corresponds to private key p1 and public key P1; key index 2 corresponds to private key p2 and public key P2; and so on. Each private key 207 and public key 208 can be identified by its key index 206.

The computing system 205 selects different subsets of the private keys 207 to be loaded onto different chargers 220a-220n. Each charger 220a-240n receives three private keys 207, respectively shown as key data 221a-221n. The contents of each subset may be randomly or pseudo-randomly selected from the overall set of private keys 207, e.g., keys p1 through p9. In some implementations, the contents of each subset may be set in a programmatic or deterministic way to provide a desired level of diversity and/or overlap among the subsets. As noted above, at least a portion of each key subset may be set based on other factors, such as a set of keys corresponding to the charger model or to the current production batch. As shown in the key data 221a-221n, some of the different subsets can include overlapping keys. In some implementations, some of the chargers 220a-220n may receive the same key subset, although the computer system 205 can define a sufficiently large number of keys and subsets so that only small groups of chargers share exactly the same subset.

In the example of FIG. 2A, the key data 221a-221n for each charger 220a-220n includes private keys 207 for three key indices 206. However, the three key indices are different for different instances of the charger. Chargers 220a-220n may store only the private keys 207 for the applicable key indices, and exclude the public keys 208. Nevertheless, in other implementations, as discussed in FIG. 2B, the corresponding public keys 208 may also be stored. The key data 221a-221n also maps the respective private keys 207 to their corresponding key indices 206, and those relationships are later used in the authentication process.

In some implementations, the private keys 207 in the key data 221a-221n are stored in protected storage of the chargers 220a-220n so it is difficult to obtain the private keys 207 even with a hardware debugger.

In addition to providing the private key subsets to configure the chargers 220a-220n, the computing system 205 can provide data to configure a set of devices 210a-210z to authenticate the chargers 220a-220n. The computing system 205 provides key data to the devices 210a-210z, so that the devices 210a-210z can each verify the authenticity of the chargers 220a-220n. To maximize compatibility, it is generally desirable for each of the devices 210a-210z to have sufficient information to be capable of authenticating each of the chargers 220a-220n. Thus, each of the devices 210a-210z may receive and store key data, e.g., the public keys 208, for each of the key indices 206. This is illustrated in FIG. 2A, with each set of key data 211a-211z including each of the public keys 208, e.g., P1-P9, for all key indices 206, e.g., 1-9. The key data 211a-211z associates the public keys 208 with their corresponding key indices. This can be significant for later use in authentication as well as to allow effective revocation, as these processes typically operate for specific key indexes not the set of keys as a whole. The devices 210a-210z may store the key data 211a-211z in a protected manner, such as protected or signed, to prevent tampering.

The example of FIG. 2A shows an initial set of keys provided to the chargers 220a-220n and devices 210a-210z by the manufacturer. Nevertheless, this type of data can additionally or alternatively be provided after the devices are sold and in use by users. For example, one or more server systems can provide data over a network to update the authentication key sets and corresponding key data from time to time. Similarly, server systems may provide data to effect revocation of individual keys or groups of keys if those keys are compromised. For example, devices 210a-210z can be informed about specific keys which have been revoked. Other communications can be performed. For example, a device 210a-210z can periodically download updates that provide key data that includes public keys and corresponding key indices to be able to operate with chargers from one or more manufacturers. The computing system 205 may provide additional keys beyond the original set of keys that were available at the time of manufacturing. For example, if 20% of the keys in an original set of 1,000 authentication keys have been compromised, 1,000 new authentication of keys may be made available, to double the total set to 2,000 authentication keys.

The example of FIG. 2A shows the arrangement for a device 210a-210z to be able to authenticate the chargers 220a-220n. In addition, or as an alternative, a complementary process can be performed so that the chargers 220a-220n can authenticate the devices 210a-210z. For example, additional key data can be provided to and stored by the devices 210a-210z, where the additional key data for the devices 210a-210z includes different proper subsets of the private keys 207. Similarly, the chargers 220a-220n can receive and store public keys 208 which can be used to verify use of valid private keys. In this manner, the chargers 220a-220n and the devices 210a-210z can each authenticate each other. In some implementations, a different set of authentication public-private key pairs may be used for each type of authentication, e.g., with one set of key pairs used for authentication of chargers and another set of key pairs used for authentication of devices to be charged.

Figure 2B:
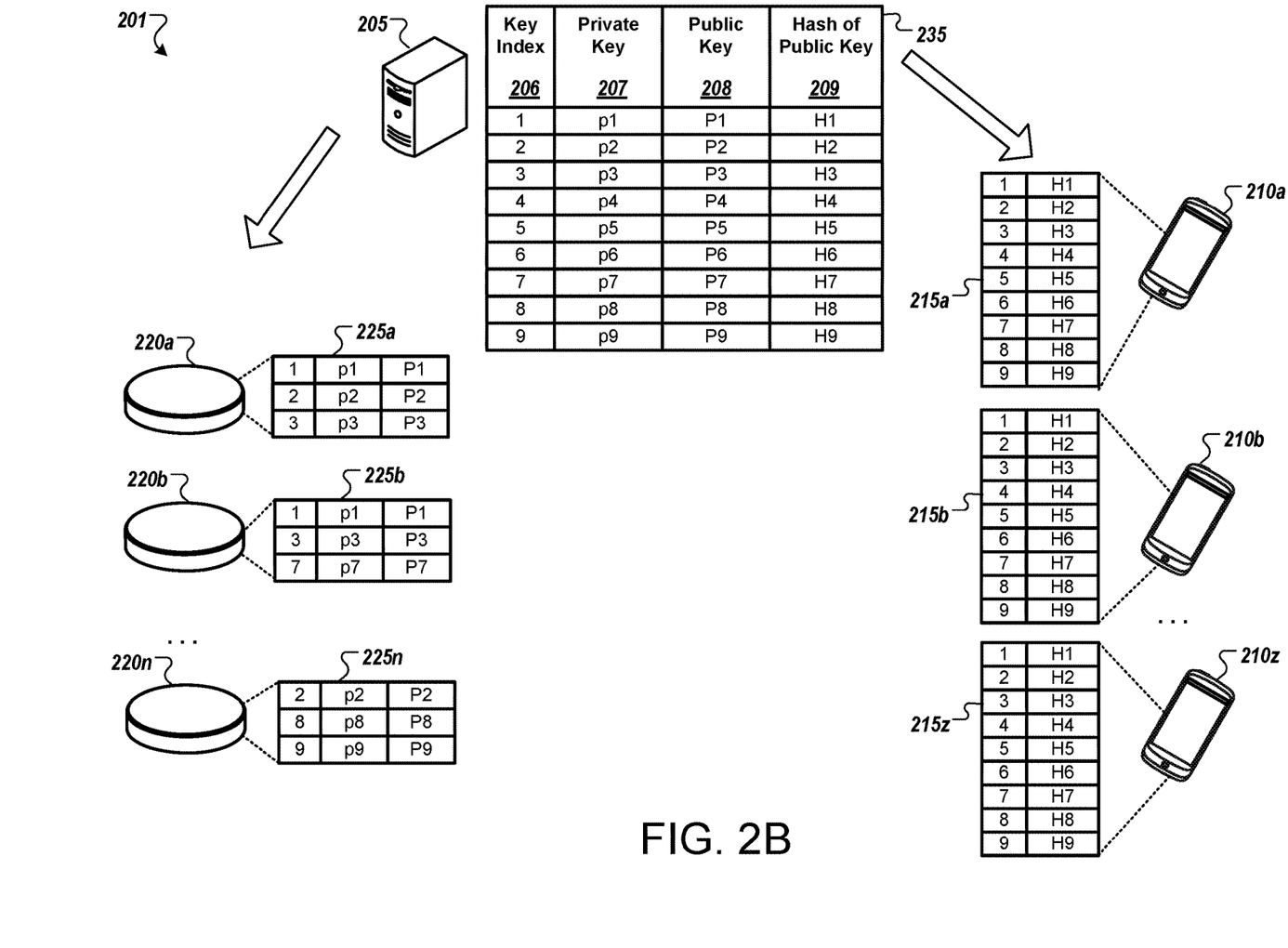

FIG. 2B is a block diagram showing another system 201 for configuring devices to perform anonymous authentication. FIG. 2B shows an alternative manner of configuring the chargers 220a-220n and 210a-210z to support anonymous authentication, with somewhat different sets of key data being provided. Rather than each device 210a-210z storing all of the public keys 208, each device 210a-210z receives and stores hashes 209 of the public keys 208. The hashes are shorter than the corresponding public keys 208, and thus require less storage on each device 210a-210z. When the system uses large numbers of authentication public-private key pairs, e.g., hundreds or thousands, the space savings can be significant.

In addition, the chargers 220a-220n receive and store the public keys 208 corresponding to their respective subsets of the private keys 207. As a result, whenever a charger 220a-220n uses a private key 207 from its locally-stored subset, the charger 220a-220n can also provide the corresponding public key 208 to one of the devices 210a-210z. The device 210a-210z that receives the public key 208 can use the hashes 209 to verify the authenticity of the public key 208 the charger provides, and then use the verified public key 208 to authenticate the charger. Having each charger 220a-220n store public keys 208 in addition to private keys 207 increases the storage requirements for the chargers 220a-220n, but because the chargers 220a-220n each store only a small subset of the total number of authentication keys, the increase is quite small and is acceptable to achieve a much greater reduction in storage requirements by the devices 210a-210z.

In the example, the computer system 205 computes a hash 209 of each public key 208. The server 205b can compute the hashes 209 using a hash function such as SHA256. The addition of these hashes 209 is shown in the table 235. In the example in FIG. 2B, the computer system 205 has nine public-private key pairs with their corresponding public key hashes 209. To configure the chargers 220a-220n, the computer system 205 selects different subsets of the private keys 207 for different chargers 220a-220n as discussed for FIG. 2A, then provides both the private key 207 and public key 208 for the selected subset. To configure the devices 210a-210z to authenticate the chargers 220a-220n, the computer system 205 provides each device 210a-210z with each of the hashes 209 for valid key indices 206. Loading hashes 215b instead of public keys 220b can reduce the amount of storage required on the devices 230b.

For very large sets of authentication keys, storage requirements may still become prohibitive for some types of devices. One way to address this issue is for devices 210a-210z to store only a subset of the public key hashes 209. For example, only the first half of the list (e.g., hashes 209 for key indexes 1-5) may be stored. Nevertheless, this increases the risk that a charger and device authentication may fail due to not having key data for any key index in common. Another option is to truncate the hash values so that each hash uses less space. For example, only the first 128 bits of each hash 209 may be stored. This, however, increases the risk that an attacker may find a hash collision and more easily compromise authentication keys.

In a similar manner as discussed for FIG. 2A, the system 201 provides additional data so that chargers 220a-220n can authenticate the devices 210a-210z. For example, in addition to what is illustrated in FIG. 2B, each device 210a-210z stores a proper subset of the private keys 207 and public keys 208, and the chargers 220a-220n each store all of the public key hashes 209. Note that the number of keys in the list and the number of keys on each device may be different for charger 120 and device 110. The devices 210a-210z will usually have much more storage available, and may store larger subsets of private keys 207 than the chargers 220a-220n.

The techniques discussed for both FIGS. 2A and 2B support revocation of keys for devices that have been compromised. If a charger 220a-220n is compromised, all of its keys are removed from the list of valid charger public keys. This will render the compromised device unable to pass authentication, and potentially thus unusable in some implementations. Nevertheless, all or nearly all of the other chargers 220a-220n will be able to continue operating normally because most if not all of the other chargers 220a-220n will not share the identical subset of keys as the compromised charger. Thus, even though some of the keys in their respective subsets may become invalidated, other keys will generally remain valid and usable for authentication. In other words, each charger 220a-220n has a different subset of N keys, so revoking all of the keys from one charger 220a-220n is unlikely to invalidate more than N/M of the keys from a second charger 120. For sample values of N=32 and M=1000, this represents a small effect on other chargers. An attacker would need to compromise a large number of devices before any given charger 120 would not have any valid keys left.

To obtain information about revocations, the devices 210a-210z can periodically download an updated list of which keys are valid or revoked from a secure server when Internet access is available.

Figure 3A:
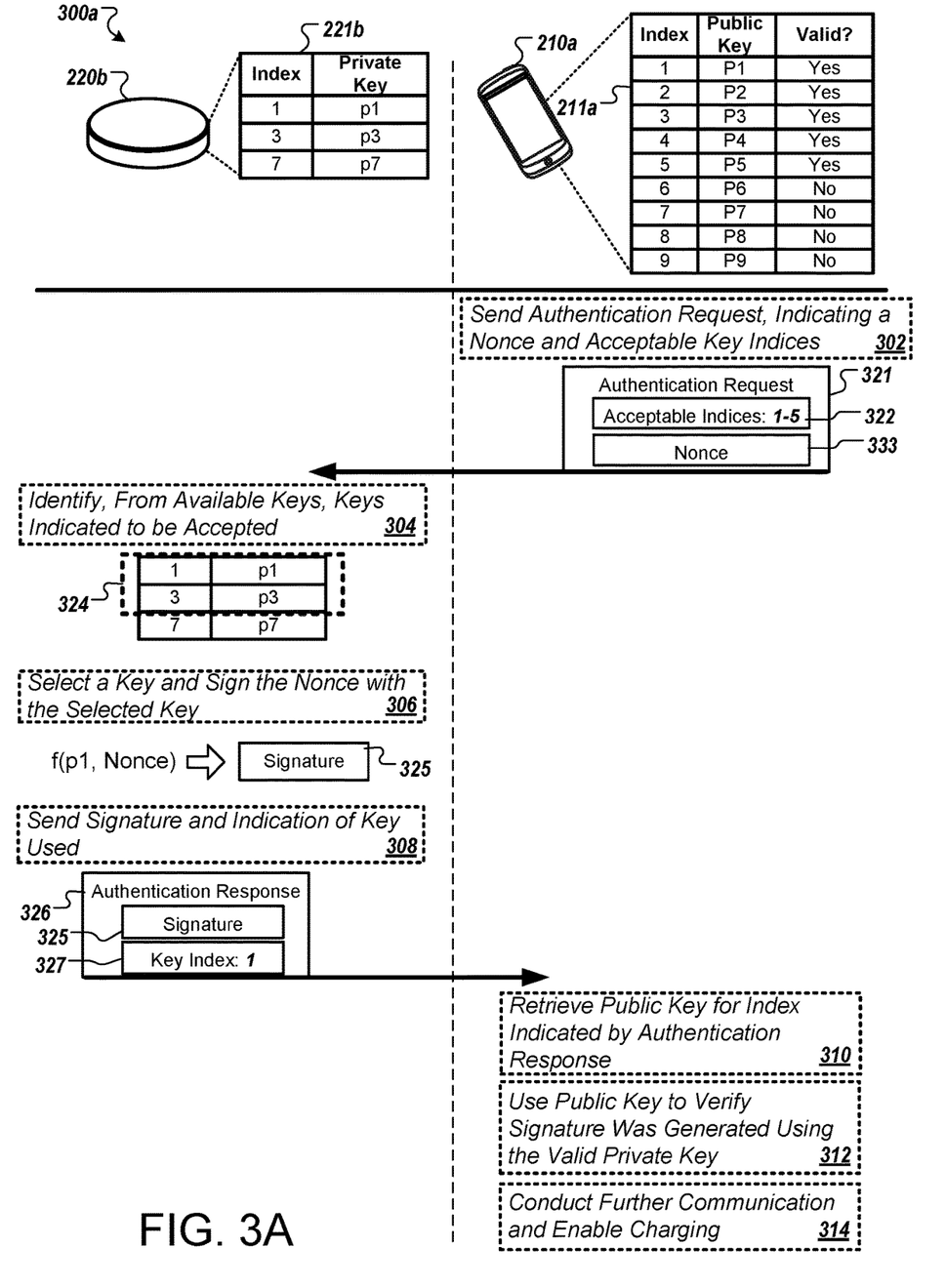

FIG. 3A is a diagram illustrating an example of a process 300a of performing anonymous authentication. In the example, the device 210a authenticates the charger 220b, while preserving the anonymity of both devices. FIG. 3A uses the data storage scheme discussed with respect to FIG. 2A, in which the charger 220b stores key data 221b that includes only a proper subset of the various private keys 207, and the charger 220b does not store the corresponding public keys 208.

The device 210a stores key data 211a that includes the public keys 208 for all of the valid authentication key pairs. The device 210a also stores information that indicates whether the various public keys 201 are still valid, so that if the authorization for a key pair is revoked, the device 210a no longer accepts it as valid. Storage of the data indicating that keys are valid or invalid can be done in various ways, such as with a flag for each key index that indicates whether a key has been revoked, by deleting public keys once the revoked, or through other data.

In step 302, the device 210a sends an authentication request 321 to the charger 220b. The authentication request includes a nonce 333 and an indication 322 of key indices that the device 210a will accept for authentication. The nonce 333 can be a random or pseudo-randomly generated value. The indication 322 of acceptable key indices can indicate the set of keys for which the device 210a stores the corresponding public keys and which have not yet been revoked.

In step 304, after the charger 220b receives the authentication request 321, the charger 220 compares the set of key indices 322 indicated by the authentication request 321 with the set of key indices for which the charger 220b stores private keys 207. This results in a set 324 of key indices with corresponding authentication private keys 207 that the charger 220b can use to perform the authentication. Only one matching key index is needed to carry out the authentication. In most cases, however, there will multiple key indices indicated by the authentication request 321 that the charger 220b stores keys 207 for and thus can use.

If no key indices overlap between those indicated in the authentication request 321 and the set of key indices for which the charger 220b stores private keys, then the charger 220b will not be able to authenticate. In this case, the charger 220b and/or the device 210a would need to be updated, for example, with new key data for additional key indices so that both have key data for a shared key index, in order for the charger 220b and the device 210a to be able to perform authentication successfully.

In step 306, the charger 220b selects a key index from the set 324 identified in step 304. The key 207 corresponding to any of the key indices in the set 324 can be used. Nevertheless, the selection process may be used to further obscure the identity of the charger 220b. The charger 220b may select the first matching key index in the set 324, the last matching key index in the set 324, a randomly or pseudo-randomly selected key index in the set, etc. In some implementations, the charger 220b varies which key is used from time to time, or at each charging session. Because different chargers 220a-220n store private keys 207 for different subsets of the key indices 206, and the chargers 220a-220n may vary which private key 207 they use from one authentication to the next, the use of a particular authentication key 207 or key index 206 does not signal the identity of a specific charger 220a-220n.

The charger 220b uses the selected key to generate a signature 325, using a predetermined function of the selected private key and the nonce 333. For example, the charger 220b may encrypt the nonce 333 using the selected private key, with the encrypted nonce serving as the signature 325.

In step 308, the charger 220b generates and sends an authentication response 326 to the device 210a. The authentication response 326 includes the signature 325 and an indication 327 of which key index 206 corresponds to the private key 207 used to generate the signature 325.

In step 310, in response to receiving the authentication response 326, the device 210a retrieves the public key 208 corresponding to the key index 327 indicated by the authentication response 326. Although the device 210a indicated that any of various key indices 206 would be acceptable for authentication, once the charger 220b has selected a key index to use, the authentication response 326 will be evaluated with using the single public key for the specific key index 327 the charger 220b selected.

In step 312, the device 210a uses the public key to verify whether the signature 325 was generated using the correct private key that corresponds to the key index 327 indicated in the authentication response. For example, given the key index of "1," the device retrieves the corresponding public key, P1, which corresponds to that key index. The device 210a then uses that public key, P1, to determine whether the signature 325 was generated using the correct private key, p1, corresponding to the same index "1" and public key, P1. For example, the device 210a can attempt to decrypt the signature 325 using the public key, P1, and then compare the decryption result with the nonce 333 the device 210a provided in the authentication request 321. If the decryption result matches the nonce 333, then the device 210a determines that authentication is successful and that the charger 220b is authorized. If the decryption result does not match the nonce 333, the authentication fails.

In step 314, after a successful authentication, the device 210 communicates further with the charger 220b and performs one or more functions that are not allowed prior to successful authentication (e.g., initiating charging, increasing the power level for charging from a default level to a higher level, etc.). In some implementations, the process also is performed with the roles reversed, e.g., with the charger 220b sending an authentication request to the device 210a, and the charger 220b may require authentication from the device 210a before certain actions or modes of charging are permitted.

Figure 3B:
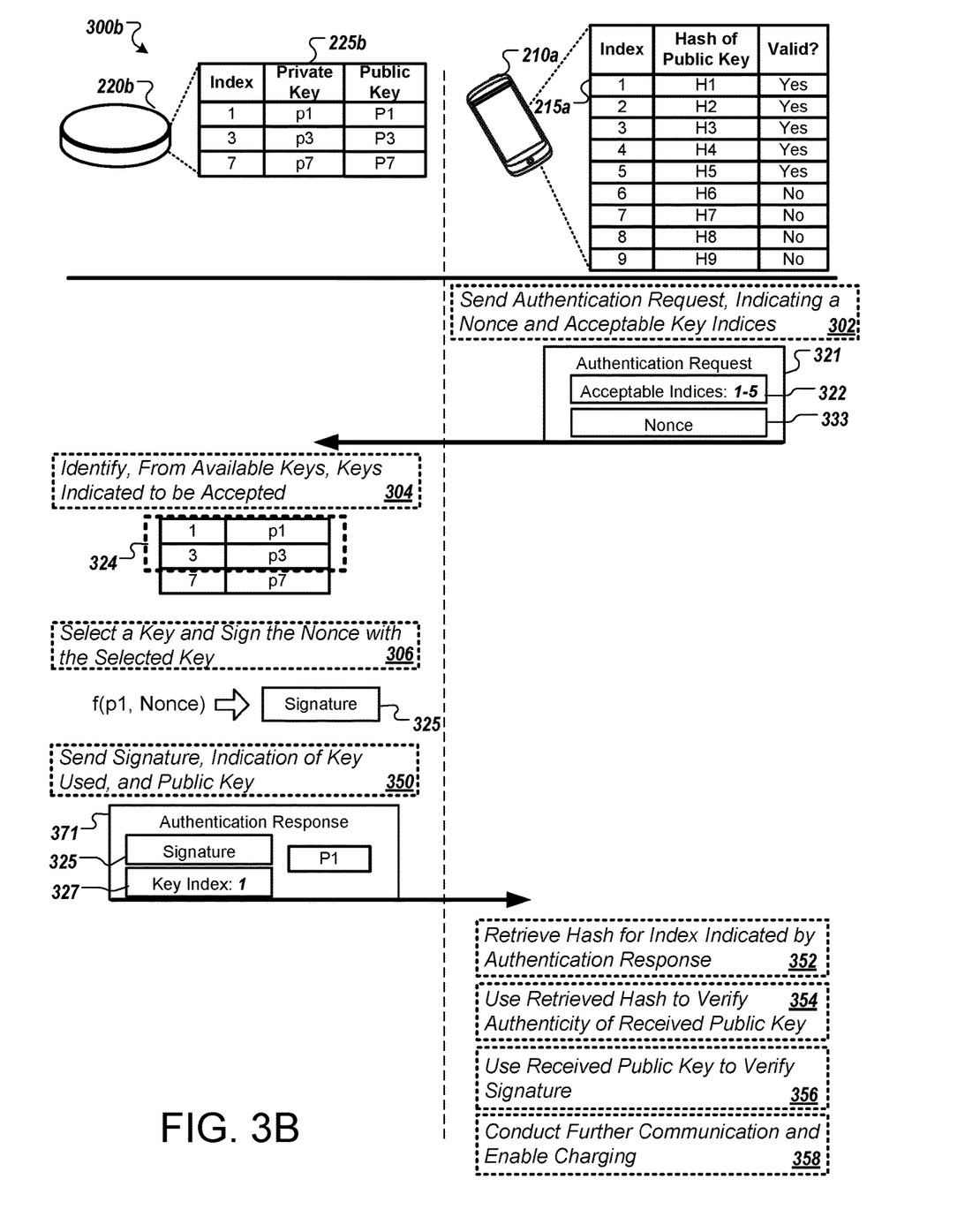

FIG. 3B is a diagram illustrating another example of a process 300b of performing anonymous authentication. The process 300b of FIG. 3B is similar to the process 300a of FIG. 3A, except the key data used is different. FIG. 3B uses the data storage scheme discussed with respect to FIG. 2B, in which the charger 220b stores key data 225b which includes private keys 206 and public keys 207, while the device 210a stores key data 215a which includes hashes 209 of public keys instead of including the public keys themselves. In the example, the device 210a authenticates the charger 220b, while preserving the anonymity of both devices.

The process 300b in FIG. 3B initially follows the same steps as described for FIG. 3A, in that the device 210a sends the authentication request 321 (step 302), the charger 220b identifies the set 324 of key indices in common, and the charger selects a key corresponding to one of the key indices in the set 324 and uses it to generate a signature 325 (306). The process 300b then differs somewhat as discussed for steps 350 to 358 below In step 350, the charger 220b generates and sends an authentication response 371 to the device 210a. The authentication response 371 includes the signature 325 and an indication 327 of which key index 206 corresponds to the private key 207 used to generate the signature 325. In addition, the authentication response 371 includes the public key for the key index specified by the indication 327. Because the device 210a does not store the public key, the charger 220b will provide the public key for later use by the device 210a.

In step 352, in response to receiving the authentication response 371, the device 210a retrieves the hash 209 corresponding to the key index indicated by the authentication response 371. Although the device 210a indicated that any of various key indices 206 would be acceptable for authentication, once the charger 220b has selected a key index to use, the authentication response 326 will be evaluated based on the hash and authentication key pair for the specific key index the charger 220b selected.

In step 354, the device 210a verifies the authenticity of the public key received in the authentication response 371. For example, the device 210a generates a hash of the received public key using a predetermined hash function, and then compares the generated hash with the hash 209 retrieved from storage of the device 210a. If the two hashes match, the device 210a determines that the received public key is genuine and can be trusted in the authentication process. If the hashes do not match, however, the authentication is considered unsuccessful.

In step 356, the device 210a uses the received public key to verify whether the signature 325 was generated using the correct private key that corresponds to the key index indicated in the authentication response 371. For example, given the key index of "1," the device 210a uses that received public key, P1, to determine whether the signature 325 was generated using the correct private key, p1, corresponding to the same index "1" and public key, P1. For example, the device 210a can attempt to decrypt the signature 325 using the public key, P1, and then compare the decryption result with the nonce 333 the device 210a provided in the authentication request 321. If the decryption result matches the nonce 333, then the device 210a determines that authentication is successful and that the charger 220b is authorized. If the decryption result does not match the nonce 333, the authentication fails.

In step 358, after a successful authentication, the device 210a communicates further with the charger 220b and perform one or more functions that are not allowed prior to successful authentication (e.g., initiating charging, increasing the power level for charging from a default level to a higher level, etc.). In some implementations, the process also is performed with the roles reversed, e.g., with the charger 220b sending an authentication request to the device 210a, and the charger 220b may require authentication from the device 210a before certain actions or modes of charging are permitted.

Figure 4:
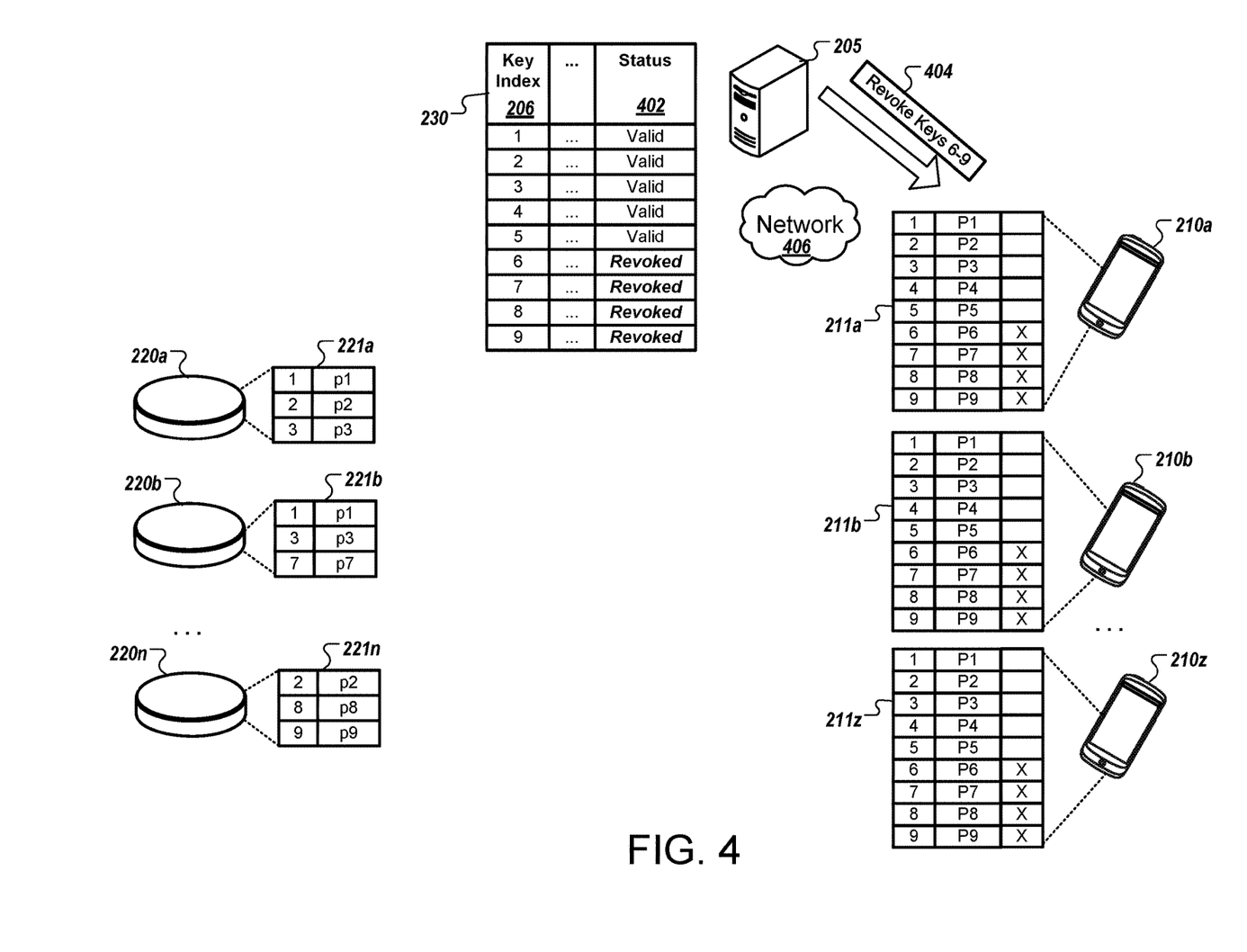
FIG. 4 is a block diagram showing an example of revocation of keys in an anonymous authentication framework.

FIG. 4 is a block diagram showing an example of revocation of keys in an anonymous authentication framework. The key data shown corresponds to that of FIG. 2A but the technique can be used in the same manner for the arrangement of FIG. 2B.

The computer system 205 can store data 402 indicating the status of various authentication public/private key pairs. An operator of the computer system may become aware that certain keys are compromised, e.g. because the operator discovers a counterfeit charger using those keys. As keys are compromised or otherwise no longer permitted for use, the computer system 205 stores data indicating that those keys have been revoked. The computer system 205 then sends revocation data 404 to the devices 210a-210z over a communication network 406. The revocation data 404 specifies key indices 206 that are no longer valid, and thus authentication using the corresponding private keys 207 should no longer be accepted. The devices 210a-210z each respond by designating the revoked key indexes as invalid, for example, by setting a flag or other value indicating the status as being revoked, by deleting the public keys corresponding to the revoked key indices, and so on.

In the example, the computer system revokes keys numbered 6-9. Each of the devices 210a-210z marks those key indexes as unusable. Later, when the devices 210a-210z send authentication requests, those requests will exclude key indices 6-9 as usable key indices. Updating the devices 210a-210z to no longer willing to accept authentication using the revoked keys in this manner removes the risk of harm from the inappropriate use of a revoked key. The chargers 220a-220n which may not be connected to a network, do not need to be updated and will continue to authenticate appropriately with any of the devices 210a-210z, as long as there is still at least one valid, non-revoked key index shared between the key data 211a-211z of the particular device 210a-210z and the key data 211a-211n of the particular charger 210a-210n.

Figure 5:
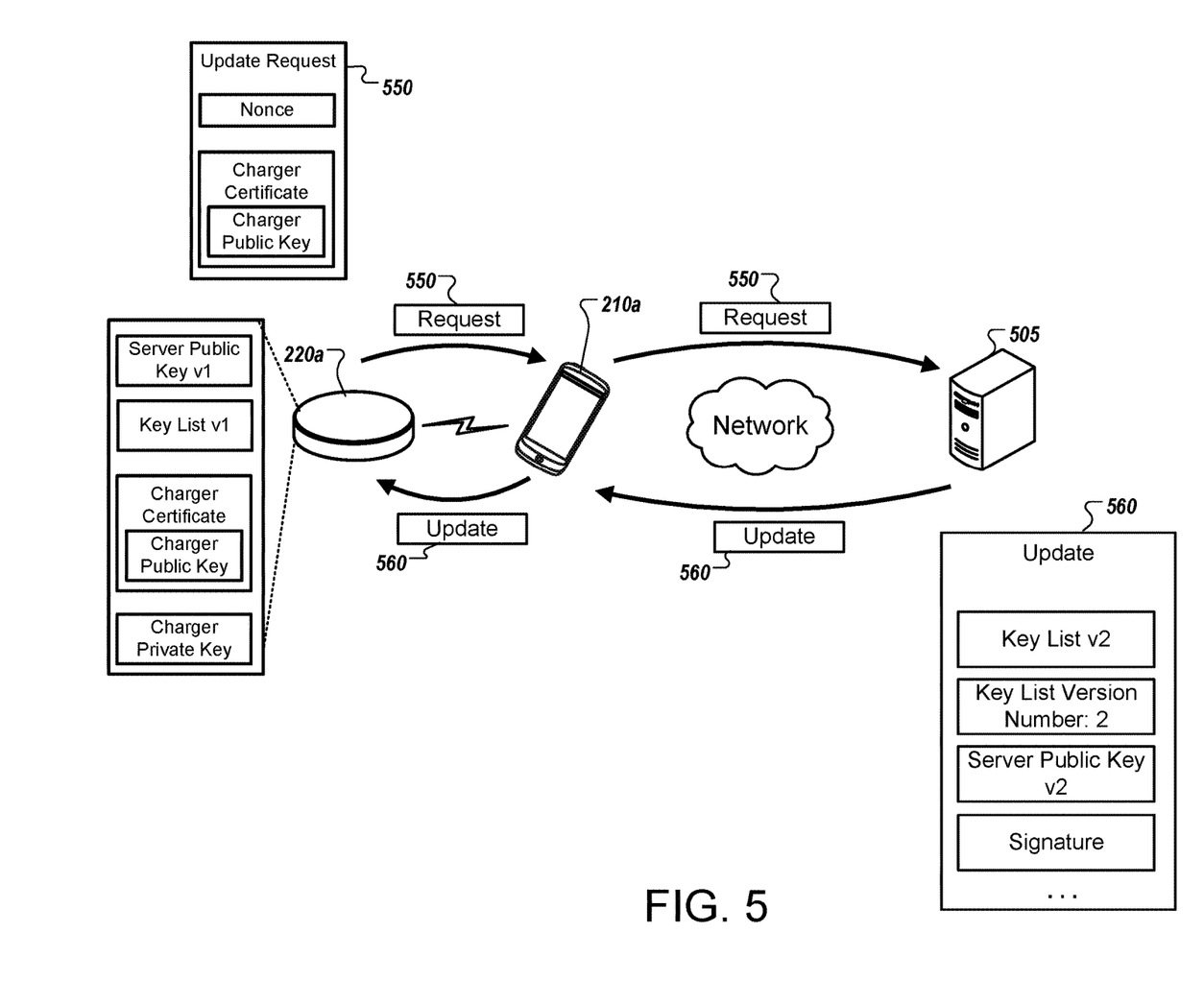
FIG. 5 is a block diagram showing an example of a process of updating authentication information in an anonymous authentication framework.

FIG. 5 is a block diagram showing an example of a process of updating authentication information in an anonymous authentication framework.

In general, a device 210a-210z can periodically download the valid key lists for all charger manufacturers from a server 505, such as the computer system 205 or another computer system. If a key list has 1000 32-byte key hashes 209, then the lists for 30 manufacturers combined would still be under 1 MB, which is a very small compared to the storage capacity of many devices.

A device 210a-210z may also learn from the server 505 which keys have been revoked. If the device 210a-210z decides that it does not have enough valid private keys (in order to prove its authenticity to chargers 220a-220n), by determining that a sufficiency criterion is not met, the device 210a-210z can request for the server 505 to provide it additional keys. The device 210a-210z can authenticate itself to the server using a device-specific certificate. Although the server 505 knows at that time which device 210a-210z is requesting new keys, it will be difficult to correlate that request to the specific key used during authentication to any given charger 220a-220n.

The server 505 may provide the device 210a-210z with keys from a different list, the server 505 is not limited to the original list of keys. For example, if the original list of 1000 device keys has been 20% compromised, the device 110 list of keys could be doubled to 2000 possible keys. Nevertheless, chargers 220a-220n would not know about the new keys and would not be able to use those keys and key indices unless they also receive updates.

Several techniques can be used to updating key lists on a charger 220a-220n. Typically, a charger 220a-220n is unlikely to have Internet access or other network access, but a charger 220a-220n can make use of the network connection of a device 210a-210z to obtain its updates. This process is illustrated in FIG. 5.

When a device 210a-210z downloads the updated list of keys that can be used to authenticate chargers 220a-220n, the device 210a-210z can also download the list of valid keys that chargers 220a-220n can use to authenticated devices 210a-210z. The list will have a version number, which increases with each update. This list and the version number and any additional data, such as a new server public key, would be signed by the server's private key, and the charger 220a-220n would be able to validate it using the server's public key which the charger 220a-220n would also store in advance. For example, the server's public key may be installed on the charger 220a-220n at the time the charger 220a-220n is manufactured. An updated key list could also contain a new server public key, in the event it is desirable to rotate the server's public key.

After a charger 220a-220n authenticates a device 210a-210z, the charger 220a-220n can ask if the device 210a-210z has an updated list from the server 505. If the device 210a-210z does, the charger 120 asks the device 210a-210z to send the new list. The charger 220a-220n then verifies the new list's signature using the server's public key. If the signature is valid, and the new list is newer than the charger's stored list, the charger 220a-220n updates its stored list. Note that this does not require the device 210a-210z to have Internet access at the time the charger 220a-220n asks for the update. But it is very likely that a charger 220a-220n will talk to enough devices that if an updated device key list is on the server, the charger 220a-220n will obtain it relatively soon.

The system can update a charger's private key set also. It is somewhat more challenging if a charger 220a-220n wants to update its own subset of charger private keys, because each charger 220-220n should have its own unique subset, and the process of updating should not reveal those keys to the device 210a-210z.

As an example of an update process, a charger 220a generates an update request 550 by using the server's public key to encrypt a nonce and its public device certificate. The charger 220a asks the current device 210a to send the request 550 to the server 505. Because the data is encrypted, the device 210a does not know what is being sent. The device 210a may refuse to pass on the data for any of multiple reasons, e.g., it has no Internet access at the current time, or it does not want to risk exposing its location by talking to the server 505 and telling it which charger it is currently using. If the device 210a is willing to communicate to the server 505, it passes on the request 550.

The server 505 authenticates that the certificate belongs to a valid (e.g., non-compromised or non-counterfeited) charger 220a-220n. The server 505 generates an update 560 for the charger 220a by encrypting some replacement private keys (potentially with corresponding public keys) using the nonce passed by the device and the public key contained in the charger's certificate. The server 505 provides the update 560 to the device 210a. The device 210a cannot determine what the update 560 contains because of the encryption. The device 210a passes the update 560 to the charger 220a.

The charger 220a decrypts the data using its private key. If the charger 220a decrypts properly, and the nonce matches, the charger 220a knows the response comes from the server 505. In this case, the charger 220a stores the new private keys for authentication by devices 210a-210n, preferentially replacing keys which are no longer valid.

The owner of a charging station may wish to do these updates with their own devices, to ensure that their chargers are updated periodically even if all customers have their devices set to refuse passing charger updates.

In some implementations, the data between charger and device can be transferred over an encrypted channel, so as not to leak information to anyone snooping wirelessly. The devices may establish that channel using any typical method (e.g. Diffie-Hellman key exchange).

Figure 6:
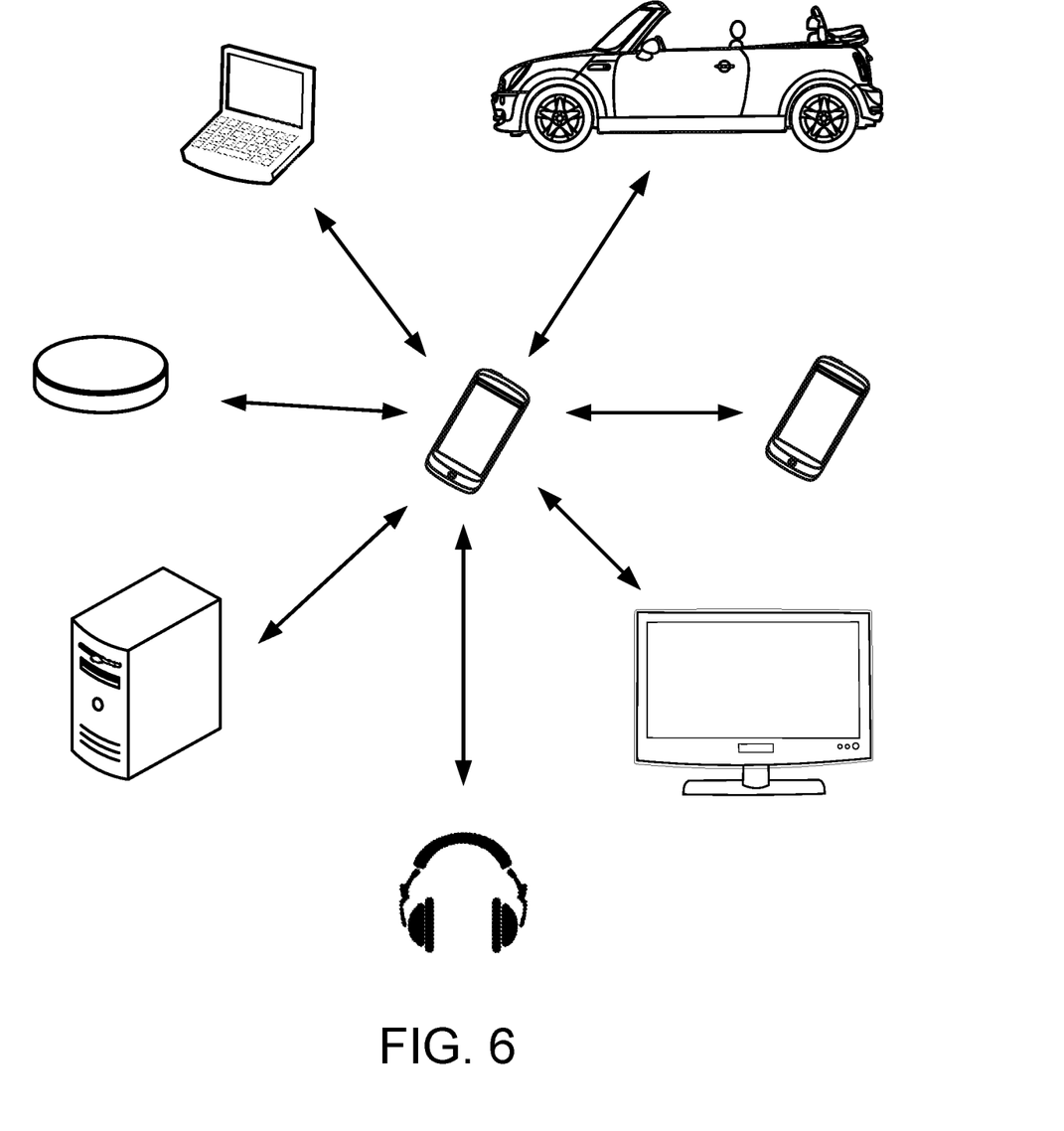
FIG. 6 is a diagram illustrating examples of various device-to-device interactions that can be authenticated using anonymous authentication.

FIG. 6 is a diagram illustrating examples of various device-to-device interactions that can be authenticated using anonymous authentication. The authentication technique discussed herein is not limited to interactions between charger 120 and a device 110 to be charged. The technique can be used for authenticating any pair of devices which may connect to or otherwise communicate with each other. For example, the authentication technique can be used for any computing device to communicate with another computing device, a peripheral device, or another hardware resource. As a few examples, a computing device may be a phone, laptop computer, desktop computer, tablet computer, a wearable device, and so on. As a few examples, a peripheral device may be a printer, a display device, headphones, a docking station, a keyboard, a mouse, and so on. Other hardware resources include appliances, home automation systems, vehicles such as automobiles, and so on.

As an example, one mobile device may communicate with another mobile device and confirm authenticity or authorization anonymously. For example, an application running on one phone may want to confirm that it is communicating wirelessly to the same application on a nearby phone, but without either phone or application providing its exact identity. In this situation, the application on the first phone may use the anonymous authentication technique to verify that the application on the second phone is genuine.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by an electronic device, the method comprising:
  accessing, by the electronic device, data stored by the electronic device that identifies authentication keys the electronic device accepts as valid;
  sending, by the electronic device to a second electronic device, an authentication request that identifies a set of authentication keys including at least some of the authentication keys the electronic device accepts as valid;
  receiving, by the electronic device, response data that the second electronic device provides in response to the authentication request, wherein the response data (i) identifies a particular authentication key from the set of authentication keys identified by the authentication request, and (ii) includes a signature generated using the particular authentication key; and authenticating, by the electronic device, the second electronic device by determining that the received signature was generated using the particular authentication key.

2. The method of claim 1, wherein the second electronic device is a wireless charger and the electronic device is a device to be charged by the wireless charger.

3. The method of claim 1, further comprising, in response to authenticating the second electronic device, initiating charging of the electronic device by the second electronic device or increasing power transfer from the second electronic device to the electronic device.

4. The method of claim 1, wherein sending the authentication request and receiving the response data are performed using a direct communication link between the electronic device and the second electronic device.

5. The method of claim 1, wherein the direct communication link between the electronic device and the second electronic device comprises an electromagnetic coupling between a power transmission coil of the second device and a power receiving coil of the electronic device, the electronic device comprising a battery and circuitry configured to charge the battery based on power received using the power receiving coil.

6. The method of claim 1, wherein accessing the data stored by the electronic device that identifies authentication keys the electronic device accepts as valid comprises accessing data that identifies a set of key indices corresponding to valid authentication keys;
wherein the authentication request specifies the set of key indices;
wherein the response data identifies the particular authentication key by indicating a particular key index for the particular authentication key; and
wherein authenticating the second electronic device comprises determining that the received signature was generated using an authentication key corresponding to the particular key index.

7. The method of claim 1, wherein the authentication request comprises a nonce;
wherein the method further comprises, in response to receiving the response data, obtaining, from data storage of the electronic device, a public key that corresponds to the particular authentication key or a hash of the public key;
wherein authenticating the second electronic device comprises using the public key or the hash to determine that that the signature was generated as a function of the nonce and a private key that corresponds to the public key.

8. The method of claim 1, comprising storing, before sending the authentication request, public keys corresponding to each of the authentication keys in set of authentication keys.

9. The method of claim 1, comprising storing, before sending the authentication request, hashes of public keys corresponding to each of the authentication keys in set of authentication keys.

10. The method of claim 1, comprising detecting, by the electronic device, the second electronic device;
wherein sending the authentication request is performed in response to detecting the second electronic device.

11. The method of claim 1, wherein the second electronic device stores only a proper subset of the indicated set of authentication keys.

12. The method of claim 1, wherein the accessing, sending, receiving, and authenticating are performed in an anonymous manner such that neither the electronic device nor the second electronic device provides uniquely identifying information.

13. An electronic device configured to perform operations comprising:
accessing, by the electronic device, data stored by the electronic device that identifies authentication keys the electronic device accepts as valid;
sending, by the electronic device to a second electronic device, an authentication request that identifies a set of authentication keys including at least some of the authentication keys the electronic device accepts as valid;
receiving, by the electronic device, response data that the second electronic device provides in response to the authentication request, wherein the response data (i) identifies a particular authentication key from the set of authentication keys identified by the authentication request, and (ii) includes a signature generated using the particular authentication key; and
authenticating, by the electronic device, the second electronic device by determining that the received signature was generated using the particular authentication key.

14. One or more non-transitory computer-readable media storing instructions that, when executed by one or more processors, cause the one or more processors to perform operations comprising:
accessing, by the electronic device, data stored by the electronic device that identifies authentication keys the electronic device accepts as valid;
sending, by the electronic device to a second electronic device, an authentication request that identifies a set of authentication keys including at least some of the authentication keys the electronic device accepts as valid;
receiving, by the electronic device, response data that the second electronic device provides in response to the authentication request, wherein the response data (i) identifies a particular authentication key from the set of authentication keys identified by the authentication request, and (ii) includes a signature generated using the particular authentication key; and
authenticating, by the electronic device, the second electronic device by determining that the received signature was generated using the particular authentication key.

* * * * *